Oct. 3, 1967     B. VIGNOVICH     3,344,607
INSULATED FROZEN EARTH STORAGE PIT AND METHOD
OF CONSTRUCTING SAME
Filed Nov. 30, 1964     2 Sheets-Sheet 1

*INVENTOR*
BARNEY VIGNOVICH
BY Young & Quigg

ATTORNEYS

United States Patent Office 3,344,607
Patented Oct. 3, 1967

3,344,607
INSULATED FROZEN EARTH STORAGE PIT AND METHOD OF CONSTRUCTING SAME
Barney Vignovich, Bartlesville, Okla., assignor to Phillips Petroleum Company, a corporation of Delaware
Filed Nov. 30, 1964, Ser. No. 414,593
7 Claims. (Cl. 61—.5)

This invention relates to storage of volatile liquids. In one aspect it relates to a method for insulating a reservoir comprising a pit in frozen earthen formations that is water permeable and water saturated. In another aspect it relates to a method for placing a layer of foam or gas bubbles adjacent the exterior surface of a storage pit in frozen earth so that the gas bubbles are frozen to provide a layer of insulation enclosing the sides and floor of the pit.

The petroleum industry produces great quantities of volatile liquid hydrocarbons as a result of processing crude oil and natural gas. Volatile liquids such as liquefied natural gas, liquefied propane and liquefied butane require enormous storage facilities particularly during periods of slack use. Increased seasonal demand for such products places increased strain on these facilities. Recently open-topped earthen reservoirs have been formed by a ring of freeze pipes sunk into the soil about the area to be excavated, circulating a refrigerant through these pipes until a ring of frozen earth results and then excavating a cavity inside the ring of frozen, water-saturated earth. A vapor-tight roof is then placed over the storage pit and liquefied hydrocarbons are contained therein. Such reservoirs have proved eminently successful and economical for the storage of propane and butane but have not been accepted by the industry for the storage of liquefied natural gas or liquefied ethane or ethylene because the extremely low temperature required to store these liquids at substantially atmospheric pressure requires an excessive amount of refrigeration to lower the temperature of the earthen formation to that required for containing these extremely low temperature boiling liquids.

According to the present invention the reservoir in frozen earth is formed by conventional methods such as freezing a ring of earth around the proposed reservoir site and excavating the unfrozen earth from the center thereof. A gas or mixture of gas and a foaming agent is then injected into the unfrozen earth adjacent the exterior surface of the frozen earth pit shell so that the layer of foam or bubbles is frozen to the exterior surface of the shell providing a layer of efficient insulation material enclosing the pit shell. In those cases where the floor of the pit comprises a water-impermeable material, such as clay or shale, of considerable thickness, only the sides of the shell are insulated with the blanket of gas bubbles. If the impervious layer is not of sufficient thickness to provide a thermal barrier between the liquid in the pit and a water-saturated, water-permeable formation below the impermeable layer, a blanket of gas bubbles is injected into the formation below the impermeable barrier so as to provide a layer of insulation on the exterior of the floor of the pit. If the pit is constructed in water-permeable, water-saturated formation such that the bottom of the shell, as well as the sides, is frozen during the initial freezing operation, the floor of the pit and the sides of the pit are covered with a layer of gas bubbles, usually in a single operation. If the pit is constructed with a frozen floor, e.g., by directional drilling of the freeze pipe holes, the floor and the sides of the pit can be coated with a blanket of foam or gas bubbles by a single injection of air or gas through the center of the frozen floor because a frozen pit constructed in this manner will be conical in form and the bubbles will migrate upwardly around the periphery of the conical pit exterior. If impermeable layers are penetrated in constructing the pit, it will be necessary to inject air or gas above and below these impermeable layers and this can be done by drilling through the frozen walls of the pit from the interior of the pit with ordinary mining equipment.

The injection of the gas around the exterior of the frozen earth shell is advantageously accomplished while the water-saturated earth is being frozen outwardly at a substantial rate so that the layer of foam will be frozen within a short period of time. The progress of the gas bubbles upwardly around the periphery of the frozen earth shell can be followed by probes thrust into the earth around the periphery of the frozen shell. Indicators such as mercaptans can be added to the gas to facilitate observation of the migration of the layer of foam upwardly around the periphery of the frozen shell. Other known methods for detecting the presence of gas can be employed, for example, a hydrocarbon gas can be utilized for forming the foam and known soil analysis methods for detection of hydrocarbons can be employed.

It is an object of this invention to provide a method for insulating a frozen earth reservoir in earthen formations that is water permeable and water saturated. It is also an object of this invention to provide an insulated earthen reservoir in frozen earth formations suitable for storing volatile liquids including liquefied natural gas. Still another object of this invention is the provision of a method for placing a blanket of insulation around the exterior of a shell of frozen earth in the earth's surface. Other objects and advantages of the invention will be apparent to those skilled in the art upon study of this disclosure including the detailed description of the invention and the appended drawing wherein:

Figure 1:
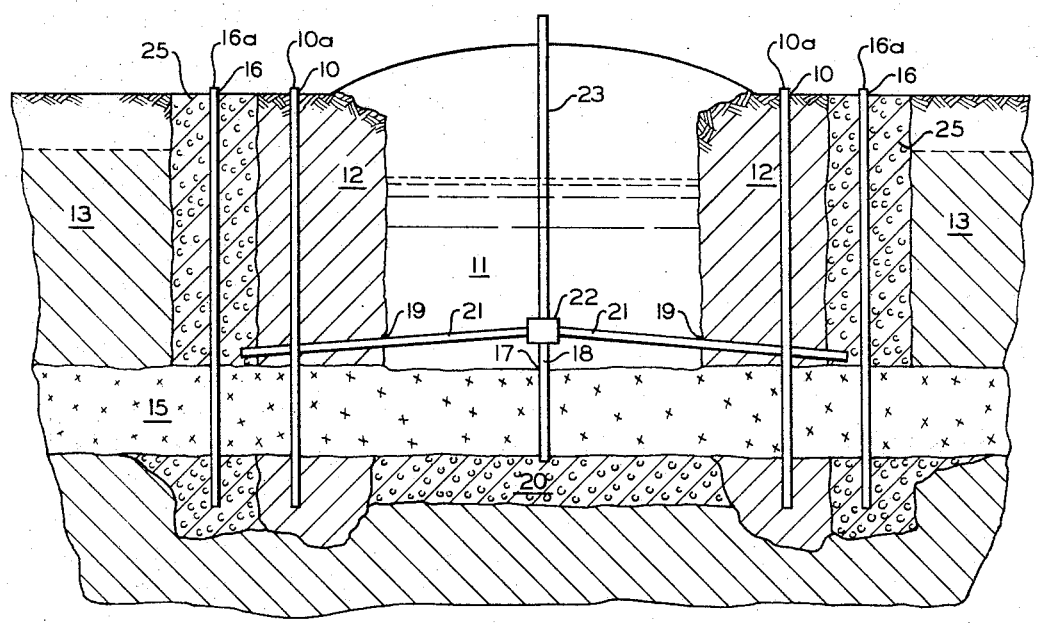
FIGURE 1 is a sectional view, in elevation, of a frozen earth reservoir insulated in accordance with the present invention.

Referring now to the drawing and particularly to FIGURE 1, a series of boreholes 10 is drilled around the periphery of the site of the proposed reservoir 11 into which is inserted freeze pipes 10a for freezing a ring of water-saturated frozen earth around the periphery of the reservoir site. A shell of frozen earth 12 is frozen in the form of a ring in the earth's surface indicated at 13. The interior of this frozen ring is then excavated to form the reservoir pit 11, the floor of which is composed of a water-impermeable layer indicated at 15. A series of boreholes 16 is drilled around the periphery of the site of the proposed reservoir 11 and spaced outwardly from the boreholes 10 for injection of gas into the earthen formation at about the bottom of the shell of frozen earth by means of gas injection conduits 16a placed therein. These boreholes will extend to a point below the impermeable stratum 15.

One or more boreholes 17 are drilled through the floor of the reservoir 11 and a conduit 18 is positioned therein for injecting gas into the water-saturated, water-permeable formation underlying the impermeable stratum 15 to form a blanket 20 of foam beneath the floor of reservoir 11. A plurality of boreholes 19 is drilled substantially horizontally through the frozen walls of the storage pit 11 to a point adjacent and above the impermeable stratum 15 and conduits 21 are positioned therein and connected to a manifold 22 for injecting gas into the water-saturated, water-permeable earth surrounding and adjacent the frozen earth shell 12 to form a blanket of foam 25 around the periphery of the frozen shell 12. Gas is supplied to conduits 17 and 19 via conduit 23.

Figure 3:
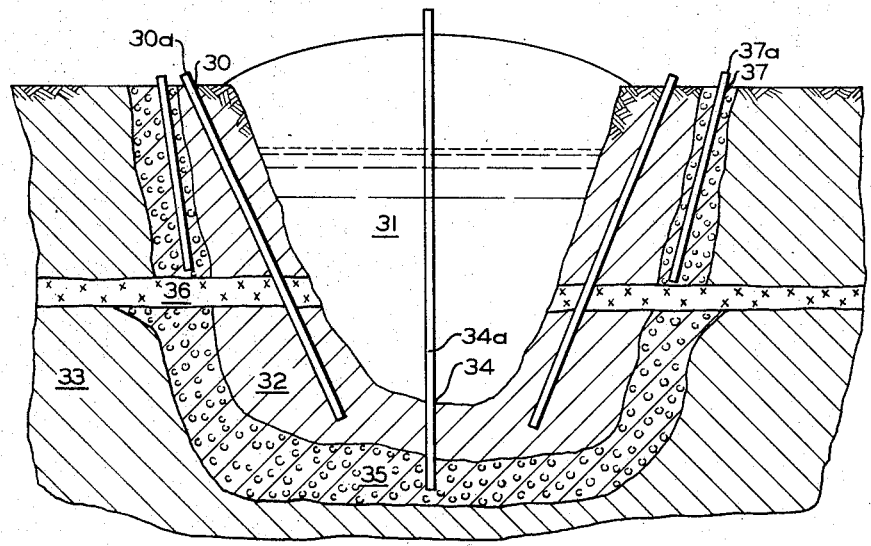
FIGURE 3 is a sectional view, in elevation, of a different type of frozen earth reservoir insulated in accordance with the present invention.
Figure 2:
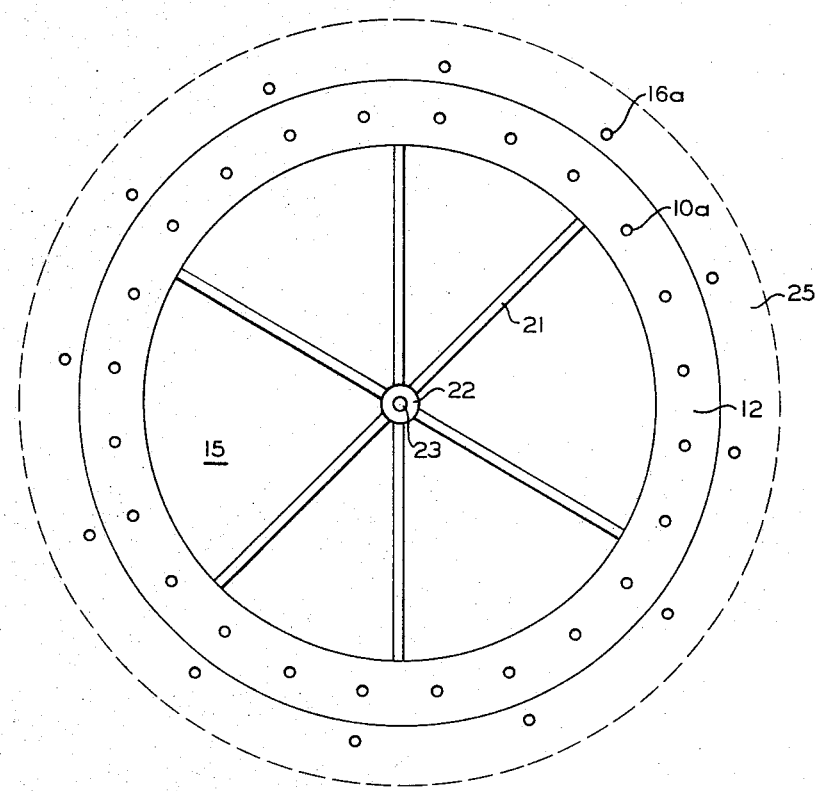
FIGURE 2 is a grade level plan view of the reservoir of FIGURE 1 with the roof removed.

FIGURE 3 illustrates a reservoir constructed in water-saturated, water-permeable earthen formations wherein an impermeable layer is not encountered that is suitable for the floor of the reservoir and therefore directional drilling techniques are employed to apply refrigeration to the floor as well as the walls of the reservoir. A series of boreholes 30 is drilled around the site of the proposed reservoir 31 by directional drilling techniques so that the boreholes converge to within earth-freezing distance at a locus below the floor of the proposed reservoir 31. Refrigerant is admitted to these boreholes by means of conduits 30a positioned therein. After the shell of frozen earth 32 is formed in the earth's surface 33 around the cite of the proposed pit 31, the interior of the frozen shell is excavated and one or more boreholes 34 is drilled through the floor of the reservoir 31 into the water-permeable, water-saturated earth formation below the frozen shell and a gas injection conduit 34a is positioned therein for injecting gas into the earthen formation below the floor of the frozen shell 32. The gas or gas and foaming agent mixture forms bubbles or foam in the water-saturated earth and the layer of foam 35 migrates outwardly and upwardly around the shell of frozen earth 32. If an impermeable layer of earthen formation such as clay or shale has been traversed in constructing the storage pit 31, as indicated at 36, a series of boreholes 37 is drilled around the periphery of the frozen shell 32 and conduits 37a are positioned therein for injecting gas into the water saturated earthen formation surrounding the frozen shell 32 above the impermeable stratum 36. Horizontal gas injection boreholes can be drilled substantially horizontally through the frozen shell from within the cavity 31 by conventional mining equipment if such is desired.

Any convenient or available gas can be utilized for forming the foam. Air is usually the most convenient and economical gas; however, $CO_2$, hydrocarbon gases, and the like, can be used if desired. The available or desired means for detecting the presence of the gas in the soil may determine the gas to be used for forming the foam.

Any of the many commercially available foaming agents can be utilized to form a more or less permanent foam. Suitable foaming agents include household detergents, alkali metal salts of sulfonated hydrocarbons, polyoxyethylated aliphatic amines, polyoxyethylated phenols, quaternary ammonium chloride and the like. The foaming agent can be injected into the formation in slugs or pills followed by injection of gas, or a mixture of gas and foaming agent can be injected.

The frozen earth storage pit will usually be formed in the earth's surface where the formation is water-saturated and where the water table extends to or nearly to the earth's surface. If a site is chosen where the formation is permeable but dry, the formation will be saturated with water prior to freezing. If a dry formation is chosen for the pit, a solution of water and foaming agent can be injected into the formation. A solution of water and foaming agent can also be injected, along with the gas in the water-saturated formation.

The blanket or layer of foam around the frozen earth provides an effective layer of insulation so that the storage pit is suitable for storage of liquefied natural gas. The initial freezing is usually accomplished with propane as the refrigerant. The foam formation should then be done and then the liquefied natural gas should be added as soon as possible so as to freeze the foam or a portion of it to form a permanent insulation layer.

That which is claimed is:

1. The method of insulating a frozen earth storage pit where the walls and floor of the pit are formed of a water saturated frozen earth shell which comprises injecting a mixture of a gas and a foaming agent into the earth adjacent the outer surface of the frozen earth shell remote from the pit so as to form a layer of foam on the surface of the frozen earth shell; and freezing the layer of foam.

2. In the method of constructing a frozen earth storage pit wherein the walls and floor of the pit are formed of a water saturated frozen earth shell, the improvement comprising injecting a gas into the earth adjacent the outer surface of the frozen earth shell remote from the pit so as to form a layer of gas bubbles in the water saturated earth on the outer surface of the frozen earth shell so that the layer of bubbles is frozen to the outer surface of the shell.

3. A frozen earth storage pit comprising an open topped shell closed at the bottom of frozen water saturated earth in the earth's surface defining the pit; and a layer of gas bubbles in the water saturated earth frozen to the surface of the frozen earth shell remote from the pit.

4. The method of insulating a frozen earth storage pit in the earth's surface which comprises sinking a ring of boreholes about the periphery of the frozen earth to a depth at least as great as that of the frozen earth; injecting a foaming agent into the earth at about the bottom of each of the boreholes; and injecting a gas into the earth at about the bottom of each of the boreholes so as to form a wall of foam around the frozen earth.

5. The method of forming a reservoir suitable for storing liquefied natural gas at substantially atmospheric pressure which comprises sinking a plurality of freeze pipes in a water-saturated, water-permeable formation of the earth's surface about the periphery of the reservoir site; circulating propane refrigerant in the freeze pipes to freeze a ring of frozen earth; excavating the unfrozen earth within the ring of frozen earth to the depth of the proposed reservoir; freezing the floor of the reservoir with propane; sinking at least one gas injection pipe through the frozen floor; sinking a plurality of gas injection pipes about the periphery of the ring of frozen earth; injecting a mixture of gas and a foaming agent through the injection pipes beneath and about the frozen earth to form a layer of foam about the frozen earth; placing a roof over the reservoir; and introducing liquefied natural gas into the reservoir.

6. The method of insulating a frozen earth storage pit where the walls of the pit are formed of a water saturated frozen earth shell and the floor of the pit is formed of a layer of water impermeable formation having thereбеneath a layer of water saturated earthen formation, which method comprises injecting a gas into the earth adjacent the outer surface of the frozen earth shell remote from the pit at about the upper surface of the water impermeable layer so as to form a first layer of bubbles on the outer surface of the frozen earth shell remote from the pit; injecting a gas into the formation beneath the impermeable layer so as to form a second layer of gas bubbles on the surface of the impermeable layer remote from the pit; and freezing the layers of bubbles.

7. A frozen earth storage pit comprising a shell having frozen water saturated earth walls and a water impermeable earthen formation floor, having a water saturated formation thereunder, defining the pit; a layer of gas bubbles surrounding the shell adjacent the outer surface of the walls remote from the pit and frozen to the outer surface of the shell; and a layer of gas bubbles beneath the impermeable layer and frozen to the lower surface thereof.

References Cited

UNITED STATES PATENTS

| | | | |
|---|---|---|---|
| 2,991,624 | 7/1961 | Closs et al. | 61—.5 |
| 3,064,436 | 11/1962 | Loofbourow et al. | 61—.5 |
| 3,159,006 | 12/1964 | Sliepcevich | 61—.5 X |
| 3,175,370 | 3/1965 | Schlumberger et al. | 61—.5 X |
| 3,205,665 | 9/1965 | Van Horn | 61—.5 |
| 3,274,785 | 9/1966 | Lange | 61—.5 X |

FOREIGN PATENTS 1,298,205  5/1962  France.

EARL J. WITMER, *Primary Examiner.*